United States Patent [19]

Hahn, Jr. et al.

[11] Patent Number: 4,956,401
[45] Date of Patent: * Sep. 11, 1990

[54] PIGMENTED LOW TEMPERATURE CURE EMULSION POLYMERS

[75] Inventors: Kenneth G. Hahn, Jr., Hinckley; Barbara L. Kunz, Bay Village, both of

[73] Assignee: The Glidden Company, Cleveland, Ohio

[*] Notice: The portion of the term of this patent subsequent to Mar. 1, 2005 has been disclaimed.

[21] Appl. No.: 108,762
[22] Filed: Oct. 15, 1987
[51] Int. Cl.$^5$ ............................ C08J 3/08; C08L 61/00
[52] U.S. Cl. ...................................... 523/310; 524/512
[58] Field of Search .......................... 523/310; 524/512
[56] References Cited

U.S. PATENT DOCUMENTS 4,728,680 3/1988 Hahn, Jr. ............................ 523/310
4,789,694 12/1988 Hahn, Jr. ............................ 523/310

Primary Examiner—Joseph L. Schofer
Assistant Examiner—J. M. Reddick
Attorney, Agent, or Firm—Thomas M. Schmitz

[57] ABSTRACT

The pigmented paint coating composition is based on a cationic free polymeric binder comprising a cationic free, functional emulsion polymer and glycoluril where the emulsion polymer are adapted to coreact to form a thermoset paint film, and said polymeric binder is combined with a low-cation opacifying pigment. The process comprises copolymerizing ethylenically unsaturated monomers, including functional monomers but excluding amine monomers, in an aqueous polymerization medium, to produce the reactive emulsion polymer. The emulsion polymer and the glycoluril derivative are treated with ion-exchange step to produce the cation-free polymeric binder.

11 Claims, No Drawings

PIGMENTED LOW TEMPERATURE CURE EMULSION POLYMERS

BACKGROUND OF THE INVENTION

This relates to commonly assigned U.S. Ser. No. 824,241 filed Jan. 30, 1986, now abandoned, and Ser. No. 943,794 filed Dec. 12, 1986, now U.S. Pat. No. 4,728,680, and the disclosure of said applications incorporated herein by reference. This invention pertains to pigmented emulsion coatings treated by cation exchange where the emulsion polymers contain hydroxyl or carboxyl groups but are free of amine groups. The stable reactive coating is based on ion-exchange of a water dispersed mixture of glycoluril resin and acrylic emulsion polymer, where the emulsion polymer contains carboxyl and/or hydroxyl groups but is free of amine groups, and the coating contains certain preferred titanium dioxide pigments.

Prior to this invention, glycoluril cured thermosetting emulsions were produced from non-ionic and acidic surfactants and generally required high levels of such surfactants. Anionic salt surfactants cause a detriment to the curing reaction. Further, pigmentation of such glycoluril and emulsion mixtures caused undesirable flocculation during the pigment grind step and subsequent let-down to produce pigmented mixtures.

Prior art U.S. Patents such as U.S. Pat. No. 4,442,257 and U.S. Pat. No. 4,444,941 and U.S. Pat. No. 4,540,735 teach the use of certain acrylic latexes crosslinked with either tetramethylol glycoluril (TMGU) or dihydroxy dimethylol ethylene urea (DDEU) for low-temperature curing coatings. Rapid cure is achieved with these products by adding from 1.5% to 3.5% by weight of a 40% solution of paratoluene sulfonic acid where a package pH of about 1.0 to 2.0 results. However, stability of these catalyzed products ordinarily is limited to 1–5 days at room temperature, and much less at elevated temperatures. Hence, the acid catalyst must be added at the time of use. Cured films of such polymer mixture often exhibit certain water sensitivity due to residual catalyst in the cured films. Without the catalyst, however, the coating has no solvent or water resistance unless baked at extremely high temperatures.

Abbey (U.S. Pat. No. 4,525,260) discloses a cationic latex for cathodic electrocoating and specifically includes amine monomers. The reference latex is based on acrylic monomers copolymerized with amine monomers, such as N,N-dimethyl-2-aminoethyl methacrylate, and catalyzed with an azo catalyst. Abbey subsequently treats the cationic latex with an ion exchange resin but to specifically remove amino monomers and amino initiator fragments. Hence, the reference is specifically directed to removing amino fragments introduced in the emulsion process. As noted below, amine latexes are not operative in this invention in that amine groups block coreactivity with a glycoluril cross-linker and inhibit the cure.

In commonly assigned U.S. Ser. No. 824,241 filed Jan. 30, 1986 and U.S. Ser. No. 943,794 filed Dec. 12, 1986, low temperature cure emulsion polymers particularly useful in paint coatings are disclosed based on a thermosetting polymeric binder composition comprising a functional addition polymer containing functional hydroxyl or carboxyl groups, but free of amine groups, and a glycoluril derivative adapted to be coreacted with the functional polymer. The functional polymer and preferably the glycoluril derivative are treated with an ion exchange process step to remove undesirable cations. The resulting resin provides a highly desirable low temperature cure paint coating adapted to thermoset without the addition of undesirable acid catalysts. However, it has been found that cation exchanged polymeric mixtures based on functional emulsion polymers adapted to be coreactive with glycoluril derivatives and pigmented with considerable amounts of conventional commercial titanium dioxide exhibit an upward pH drift of as much as one pH unit within a few days after cation exchange of the polymeric binder and/or the paint coating, which does not seem to materially effect the stability of low heat cures, but does retard room temperature cure, and thus the commercial utility of process is effectively limited to darker color paints. In this regard, it has been found that conventional surface treatments of commercial titanium dioxide pigments include cations, particularly aluminum oxide cations, which eventually are attacked by acid and removed into the paint mixture thereby effectively increasing the pH of the paint mixture.

It now has been found that thermosetting pigmented emulsion dispersions useful as paint coatings containing glycoluril-type cross-linkers, where the mixture is subsequently subjected to cationic exchange to remove the cations from the anionic surfactant as well as from other sources can be substantially improved by incorporating opacifying pigments substantially free of cations on the pigment surfaces. The emulsion polymer specifically contains hydroxyl and/or carboxyl groups, but not amine groups, and is adapted to coreact with the glycoluril derivative. Amine groups block reactivity, inhibit the cure and render the process of this invention inoperative. In accordance with this invention, the ion-exchange process for removing undesirable cations from the polymeric binder is utilized in conjunction with specific opacified pigments substantially free of cations or cationic surface treatment. The cationic-free opacified pigments comprise untreated rutile and anatase titanium dioxide, or conventional surface treated commercial titanium dioxide rutile or anatase pigments with the cationic surface treatment removed to eliminate the cation rich pigment surfaces. By using untreated titanium dioxide or conventional titanium dioxide with cationic surface treatments removed, the pH drift is stabilized and commercially useful light color paints can be produced. Excellent room temperature cures can be achieved. Either rutile or anatase titanium dioxide, free of surface cations, particularly enables a substantially improved cure and cross-linking of the thermosetting paint coating. A further advantage of cation-free pigments is that the resulting pigmented paint coating is substantially free of thixotropic properties. These and other advantages of ths invention are further illustrated by the detailed description of the invention and the illustrated examples.

SUMMARY OF THE INVENTION

Briefly, the invention pertains to a stabilized pigmented aqueous dispersion suitable for protective paint coating comprising a reactive functional emulsion polymer and a crosslinking agent adapted to cure with said reactive polymer in combination with cation-free opacifying pigments. The emulsion polymer contains hydroxyls or carboxyls but is free of amine groups. The composition is produced by first compounding the glycoluril and emulsion polymer dispersion and then treating the same with an ion exchange resin, preferably a cation exchange resin, individually or together, to provide coatings having superior storage stability and which cure without the addition of acid cure catalyst. The ion-exchange treated polymeric binder is combined with cation-free opacified pigment such as titanium dioxide. The present invention provides a stable pigmented coating which, when dried at room temperature or heated in a baking oven, reacts to form a crosslinked film with good performance properties.

DETAILED DESCRIPTION OF THE INVENTION

In accordance with this invention, the paint coating is based on an ion-exchange treated polymeric binder comprising a reactive functional emulsion polymer and a coreactive glycoluril derivative in combination with opacifying pigment substantially free of pigment surface cations.

The cation free opacifying pigments useful in this invention are generally pigments having a refractive index of at least about 1.8. Typical white opacifying pigments include rutile and anatase titanium dioxide, lithopone, zinc sulfide, lead titanate, antimony oxide, zirconium oxide, titanium calcium, white lead, titanium barium, zinc oxide, leaded zinc oxide, mixtures of the same, and like pigments, the preferred white inorganic opacifying pigments are anatase and rutile titanium dioxide having a weight average particle size between about 0.2 to 0.4 microns. Titanium yellow and like pigments having a high refractive index can be utilized as opacifying pigments as well as imparting tints to the paint. Although most opacifying pigments are white, all opacifying pigments having a high index of refraction above about 1.8 should be considered an opacifying pigment for the purpose of this invention regardless of its tinting (tinctorial) effect on the resulting paint film. Opacifying pigments comprise at least about 5% and up to about 40% on a dry solids volume basis of the latex paint and preferably between about 10% to 25% on a dry solids volume basis. Ordinary paint films are usually about 1 to 3 mils thick when applied by brush or roller, and in such instance, between about 5% and about 25% opacifying pigments such as rutile $TiO_2$ on a dry solids volume basis is required for the opacified paint of this invention. Preferred cation-free opacifying pigments comprise rutile and anatase titanium dioxide pigments. Preferably the pigments are produced without any surface treatment and merely washed, micronized and filtered at the end of the pigment manufacturing process without any surface treatment. In particular, all post treatment of the pigment with cationic materials is avoided to produce a reactive cation-free pigment surface. If commercial titanium dioxide pigments are utilized, these pigments typically contain cationic surface treatments, typically an aluminum oxide treatment or coating, which must be removed to render the pigment useful in this invention. Such commercial cations surface coatings applied to pigment surfaces can be removed by treatment with strong acids, followed by rinsing with deionized water. Cation-free opacifying pigments contain less than 0.5% by weight residual cations and preferably are essentially free of cations.

The polymeric binder comprising the reactive functional emulsion and coreactive glycoluril derivative is treated with an ion-exchange resin to remove undesirable cations from the polymeric binder. Post ion-exchange treatment is best effected with protonated cation exchange resin. Protonated cation exchange resin typically comprises crosslinked macroreticular polystyrene beads having sulfonic acid surface groups, that is, the beads have a sulfonated surface. Bead sizes are typically about 1 millimeter in diameter more or less. In the present invention, the coating is not externally catalyzed, but is brought into intimate contact with a protonated cation exchange resin, such as Amberlite 200 CH from Rohm and Haas. This contact can be effected by adding from 1%-100% by weight of the exchange resin to the coating with agitation and mixing until the pH has stabilized below 2.5, and typically around 1.2-1.8. The mixture can be strained through a filter medium such as linen cloth of a size small enough to remove all of the solid exchange resin, whereby the filtered coating exhibits no changes in pH or viscosity over 3 months or longer. The coating can be passed over a column bed of the exchange resin at a rate which yields a coating pH of less than 2.5, preferably around 1.2-1.8. The ion-exchange imparts no change in stability or in pH or viscosity over a 3-month period.

Referring to the reactive emulsion polymer, the reactive polymer contains reactive hydroxyl, carboxyl, or acrylamide groups, but is free of amine groups. The emulsion polymer comprises copolymerized ethylenically unsaturated monomers including at least about 2% copolymerized reactive monomers of acrylamide, carboxyl monomer, or hydroxyl monomer. The acrylamide monomers can be acrylamide, methacrylamide, ethyacrylamide; and similar alkyl acrylamide and methacrylamide monomers including for example, N-methylol acrylamide, N-ethanol acrylamide, N-propanol acrylamide, N-methylol methacrylamide, N-ethanol methacrylamide, and similar acrylamide and methacrylamide monomers. Carboxyl containing monomers are ethylenically unsaturated monomers containing carboxyl groups, including lower alkyl acrylate or methacrylate monomers such as acrylic, methacrylic, or ethacrylic acid. Other useful carboxyl reactants include itaconic, citriconic, fumaric, maleic, mesaconic and aconitric acids. The preferred acids are acrylic and methacrylic acids. Hydroxyl containing monomers are ethylenically unsaturated monomers containing a hydroxyl group and can include for example, hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Ethylenically unsaturated monomers other than acrylamide, carboxyl, and hydroxyl monomers can include vinyl unsaturated monomers containing vinyl double bond unsaturation including, for example, vinyl esters such as vinyl acetate, vinyl propionate, vinyl butyrates, vinyl benzoate, isopropenyl acetate and like vinyl esters; vinyl amides, such as acrylamide and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy catalyst, common redox catalyst, ultraviolet radiation, or the like.

Preferred latex binders for this invention are acrylic or modified acrylic binders such as set forth in U.S. Pat. No. 4,444,941 and U.S. Pat. No. 4,442,257, provided the emulsion polymer is free of amine groups. A preferred emulsion polymer free of amine groups preferably comprises by weight between 20% and 95% acrylate or methacrylate monomers, 0% and 20% functional monomer selected from a carboxyl monomer, a hydroxyl monomer, or acrylamide monomer, or mixtures of such functional monomers, and 0% to 50% other ethylenically unsaturated monomer. A preferred emulsion polymer comprises a latex polymer consisting of copolymerized monomers of 20%–50% methyl methacrylate, 0%–20% ethyl acrylate, 20%–50% butyl acrylate, and 1%–20% of a hydroxyl-bearing monomer.

The reactive emulsion polymer containing reactive hydroxyl, carboxyl, or acrylamide groups can be crosslinked by reaction with a glycoluril derivative. Glycoluril derivatives are disclosed in U.S. Pat. No. 4,064,191 and are also known as acetyleneureas. Glycolurils are derived by reacting two moles of urea with one mole of glyoxal to provide a complex ring structure as shown in U.S. Pat. No. 4,540,735; where substitute constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethyoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxyl ethylene urea which is believed to have the chemical structure as follows:

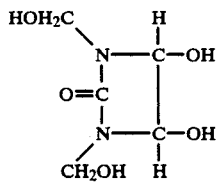

In practice, the ethylenic monomers can be polymerized in an aqueous medium at a pH preferably between about 1.0 and 6 to form a reactive emulsion polymer. Generally, the polymerization is conducted at a temperature of about 20°–100° C. in the presence of a free radical generating initiator. Commonly used free radical initiators include various peroxygen compounds such as the persulfates, benzoyl peroxide, t-butyl hydroperoxide, cumene hydroperoxide, di-t-butyl perphthalate, pelargonyl peroxide and 1-hydroxycyclohexyl hydroperoxide. Particularly preferred as polymerization initiators are the water-soluble peroxygen compound such as hydrogen peroxide and the sodium, potassium and ammonium persulfates used by themselves or in activated "redox" type systems. Typical "redox" systems include alkali metal persulfates with a reducing substance such as a polyhydroxy phenol. The amount of initiator used will generally be in the range between about 0.1 to 3% by weight based on the monomers and preferably is maintained between 0.15 and 1% by weight of the monomers. Usually the initiator will all be charged at the outset of the polymerization; however, incremental addition or proportioning of the initiator is often employed.

Emulsifiers used to prepare the latices of this invention are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanol-amine lauryl sulfate, ethylamide lauryl sulfate; alkyli metal and ammonium salts of sulfonated petroleum or paraffin oils, sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used can be from about 0.01 to 6% or more by weight of the monomers. All of the emulsifier may be added at the beginning of the polymerization or may be added incrementally or by proportioning throughout the run. Typical polymerizations for the preparation of the emulsion polymers of this invention are conducted by charging the monomers into the polymerization reactor which contains water and a portion of the emulsifying agent. The reactor and its contents are heated and the initiator added.

A coating is prepared by blending from about 20 to 95 parts of emulsion polymer with from about 5 to 80 parts of one of the aforementioned crosslinkers, preferably about 70 to 95 parts of emulsion polymer with about 5 to 30 parts of crosslinker to form a polymeric binder composition which can be combined with cation-free opacifying pigments. Cation-free opacifying pigments contain less than about 0.5% by weight residual aluminum and preferably are essentially free of cations including aluminum cations.

In accordance with this invention, a uniform dispersion of pigments can be obtained, using conventional anionic and nonionic surfactants. This dispersion is stable and shows no flocculation when combined with ion-exchanged glycoluril. Accordingly, a stable dispersion can be made using conventional surfactants which subsequently can be acidified by cation exchange to provide compatibility and stability in let down steps and pigment grinds if desired. Conventional basic surfactant can be used as the dispersant to enable a dilatent-free pigment grind. Cation exchange prevents settling and flocculation and further prevents cure inhibition in the final paint.

The following examples, wherein percentages are by weight, further illustrate the merits of this invention.

EXAMPLE 1

(a) Latex. An emulsion polymer was produced from the following components:

|  | Grams |
| --- | --- |
| Deionized Water | 85.6 |
| Sodium Dihexyl Sulfosuccinate | 0.5 |
| Ammonium Persulfate | 0.273 |
| Sodium Bis-tridecyl Sulfosuccinate | 0.319 |
| Butyl Acrylate | 39.0 |
| Methyl Methacrylate | 39.0 |
| N-isobutoxymethylol Acrylamide | 12.0 |
| 2-hydroxyethyl Acrylate | 6.0 |
| Glacial Methacrylic Acid | 4.0 |
| Sodium Formaldehyde Sulfoxilate | 0.180 |
| Tertiary Butyl Hydroperoxide | 0.012 |

The emulsion polymer is prepared as follows: The monomers are polymerized in a conventional reactor using a standard procedure of metering in the main body of monomer into the heated water plus surfactant over 2- to 5-hour intervals. Batch loading of monomer is possible but not preferred. Changing the monomer composition during the feed is also possible and may lead to faster cure and/or cleaner batches. The reaction is run at 60°-86° C. The sodium formaldehyde sulfoxilate and t-butyl hydroperoxide are added after the main body of monomers have been polymerized in order that traces of free monomers are reacted. The emulsion polymer latex is particularly suitable as a binder system for a paint composition. The latex has an N.V. content of 52% by weight; a density of 8.9 lb./gallon; and has a pH of 3.1.

(b) Paint Coating. The foregoing latex (a) can be utilized to produce a useful paint composition which can be applied to a substrate and cured at low temperatures such as 10 minutes at 120° F., or an oven bake and/or infrared heat to achieve a substrate surface temperature of from about 100° F. to about 260° F. A typical paint composition is as follows:

|  | Grams |
| --- | --- |
| Latex (a) | 666 |
| Cymel 1175[1] | 175 |
| Foamaster O (defoamer)[2] | 1 |
| Isopropanol | 34 |
| Butyl Cellosolve[3] | 20 |

[1]Dihydroxy dimethylol ethylene urea, 45% N.V. (American Cyanamid Company).
[2]Diamond Shamrock Corporation.
[3]Union Carbide Corporation.

This coating had a pH of 4.2. About 200 grams thereof were combined with 100 grams Amberlite 200 CH (macroreticular, strongly acidic, cation exchange resin from Rohm and Haas Corporation). After stirring for 30 minutes, the coating was strained through linen cloth to remove the cation exchange resin. The product had a pH of 1.5 and was combined with about 35 grams of untreated, cation-free titanium dioxide in accordance with this invention. Superior extended room temperatures and elevated temperature stability was achieved which was a substantial improvement over similar compositions containing conventional titanium dioxide having an aluminum oxide surface treatment.

In accordance with a preferred aspect of this invention, the ion-exchange process for removing undesirable cations from the polymeric binder is utilized in conjunction with specific opacified pigments substantially free of cations or cationic surface treatment. The cation-free opacified pigments comprise untreated rutile and anatase titanium dioxide, or conventional surface treated commercial titanium dioxide rutile or anatase pigments with the cationic surface treatment removed to eliminate the cation rich pigment surfaces. By using untreated titanium dioxide or conventional titanium dioxide with cationic surface treatments removed, the pH drift is stabilized and commercially useful light color paints can be produced. Excellent room temperature cures can be achieved. A further advantage of cation-free rutile or anatase is that the resulting pigmented paint coating is substantially free of thixotropic properties. These and other advantages of this aspect of the invention are illustrated by the following illustrative examples.

EXAMPLE 2

Rutile titanium dioxide was obtained without surface treatment, but contained about 0.5% residual aluminum from its manufacturing process. The pigment was merely washed, micronized, and filtered without any surface treatment. The essentially cation-free titanium dioxide was incorporated into a polymeric binder comprising reactive latex and glycoluril at a level of 200 pounds pigment per 100 gallons latex. This is identified below as "Grind #2." This paint was compared with similarly prepared paint using conventional commercial titanium dioxide having a surface treatment containing aluminum oxide, at about 3.5% aluminum. This is identified below as "Grind #1."

| Letdown |  | Grams |
| --- | --- | --- |
| Acrylic Copolymer Latex |  | 374.08 |
| Glycoluril (Cymel 1172) |  | 98.2 |
| Defoamer |  | 1.0 |
| Butyl Carbitol Acetate |  | 20.0 |

|  | Grind #1 | Grind #2 |
| --- | --- | --- |
| D.I. Water | 65.0 | 65.0 |
| Defoamer | 0.40 | 0.40 |
| Surfactant | 4.5 | 4.5 |
| Polyethylene Surfactant | 4.5 | 4.5 |
|  | pH = 2 | pH = 2 |
| Surface-treated TiO$_2$ | 105.2 |  |
|  | pH = 3.60 |  |
| Low-cation TiO$_2$ |  | 105.2 |
|  |  | pH = 2 |
| Silica | 250.4 | 250.4 |
|  | pH = 5.16 | pH = 3.75 |
| D.I. Water | 4.5 | 4.5 |
| Combine each #1 and #2 with 246.5 grams letdown | pH = 4.74 | pH = 4.02 |

Improved pH Stability on TiO$_2$-Containing Cation Exchange Coatings

Sample coatings #1 and #2 comprising about 450 gms. of each coating were put in 1-liter beakers. With mixing, 100 gms. of Amberlite 200 CH cation exchange resin was added to each. After 30 minutes of mixing, the samples were filtered to remove exchange resin, and tested as follows:

|  | Sample #1 | Sample #2 |
|---|---|---|
| pH, init. | 2.07 | 1.90 |
| After 1 hour | 2.23 | 1.90 |
| After 1¼ hours | 2.31 | 1.89 |
| After 64 hours | 3.02 | 2.35 |

The experimental low-cation titanium dioxide gave superior stability. Immediately after treatment, both were applied on sealed Leneta paper with a 3 mil. bird coater, and baked 2 min. @ 250° F.

Sample #1 gave 20–22 MEK rubs; Sample #2 gave 40 MEK rubs, indicating a better cure.

Additional samples were similarly coated and allowed to dry ambient (75° F., 16% R.H.)

|  | Sample 1 | | Sample 2 | |
|---|---|---|---|---|
|  | Water Rubs | MEK Rub | Water Rubs | MEK Rubs |
| 1 hour (approx.) | 22 | 8 | 50 min. | 70 | 16 |
| 1½ hr. | 28 | 9 | 70 min. | 200 soft | 20 |
| 66 hrs. | 200, not soft | 15 | 2 hr. | 200 soft | 21 |
|  |  |  | 66 hrs. | 200, not soft | 28 |

After 4 days, additional air-dry samples were tested, with the aged coatings. Sample #1 had a 3.05 pH and Sample #2 had a 2.36 pH.

|  | Sample 1 | | Sample 2 | |
|---|---|---|---|---|
|  | Water Rubs | MEK Rub | Water Rubs | MEK Rubs |
| 1 hour | 6 | 6 | 10 | 7 |
| 2 hours | 16 | 7 | 20 | 10 |
| 5 hours | 18 | 10 | 26 | 14 |
| 8.5 hrs. | 18 | 9 | 119 | 19 |

This demonstrated that low-cation titanium dioxide is better than standard surface treated titanium dioxide.

The following examples illustrate the advantages of untreated, cation-free anatase over conventional rutile titanium dioxide.

EXAMPLE 3

| Raw Material | Weight |
|---|---|
| Acrylic Copolymer Latex | 374 |
| Glycoluril (Cymel 1175) λ | 98.2 |
| Premix Stabilizer (surfactant) | 25 |
| Defoamer | 1 |
| D.I. Water | 149 |
| Grind |  |
| D.I. Water | 139 |
| Defoamer | 1 |
| Surfactant | 9 |
| Polyethylene Oxide Surfactant | 9 |
| Commercial Titanium dioxide (3.5% aluminum) | 210 |
| Silica | 501 |

Add grind to letdown and mix 16 hours minimum. After mixing 16 hours, a pH probe was put in the paint. Small quantities of Amberlite 200 CH (protonated cation exchange resin from Rohm & Haas) were added. When pH stabilized, samples were pulled, applied by 3 mil. bird coater to Leneta paper, and baked 2 minutes @ 250° F. hot air. Cure was checked each time. After completion, the sample was aged and periodically checked for pH and cure.

| Total gms. exchange resin added, cumulative | Stabilized pH | Cure (MEK Rubs) |
|---|---|---|
| 0 | 4.63 | 5 |
| 10.0 | 3.20 | 16–18 |
| 15.0 | 3.00 | 27–28 |
| 42.0 | 2.20 | 53–55 |
| 68.0 | 2.01 | 78–95 |
| 95.0 | 1.99 | 83–110 |
| Aged 96 hrs. @ R.T. | 2.92 | 83–110 |
| Aged 96 hrs. @ 120° F. | 3.24 | 83–110 |

EXAMPLE 4

A comparable paint was made, but with the rutile $TiO_2$ replaced by anatase $TiO_2$ and indicating during exchange, little, if any, thixotropy developed.

The stability/cure on this paint is:

|  | Storage Conditions | | | |
|---|---|---|---|---|
|  | Room Temp. pH | Room Temp. MEK Rubs | 120° F. pH | 120° F. MEK Rubs |
| Initial | 1.74–1.80 | 220–230 | N.A. | N.A. |
| 68 hrs. | 1.87 | 220–250 | 1.82 | 220–250 |
| 93 hrs. | 1.84 | N.A. | 1.92 | N.A. |
| 117 hrs. | 1.88 | N.A. | 1.95 | N.A. |
| 141 | 1.90 | N.A. | 1.93 | N.A. |
| 11 | 1.98 | 390 | 2.07 | 390 |

Accelerated heat aging is not diminishing the cure on this coating. Furthermore, while heat-aged aluminum-containing rutile samples show noticeable thixotropy, there is no viscosity build with the anatase sample, and no thixotropy is noted.

Further, when both were applied to water-stained hardboard, the anatase-bearing paint showed very little stain bleed, while the rutile samples showed some stain bleed.

In the following example, a commercial grade of rutile titanium dioxide was used, which is free of aluminum cations, both in manufacture and surface treatment (<0.1% by analysis).

EXAMPLE 5

| Raw Material | Weight (g) |
|---|---|
| Letdown |  |
| Acrylic Copolymer Latex | 365 |
| Coalescing Solvent | 11 |
| Glycoluril (Cymel 1175) | 96 |
| Defoamer | 1 |
| Grind |  |
| Deionized Water | 137 |
| Defoamer | 0.5 |
| Surfactant | 8 |
| Polyethylene Oxide Surfactant | 8 |
| Silica | 551 |
| Aluminum-free Commercial Titanium Dioxide | 214 |

The grind was added to the letdown and mixed 16 hours. Initial pH was 4.5.

125 grams of Amberlite 200 CH (Protonated Cation Exchange Resin, Rohm and Haas) was added to the paint with mixing. pH stabilized at 1.5. The coating was filtered and tested as follows:

pH 1.5, no pseudoplastic behavior.

A sample was applied to sealed Leneta paper by a 3 mil Bird coater, and baked 2 minutes at 250° F. It was not attacked by 100 MEK rubs or 200 water rubs.

A sample of the coating was aged 2 months at room temperature.

No viscosity change was noted. pH was now 1.7, for a change of 0.2 units over 2 months.

Cure was again test over Leneta paper (3 mil Bird coater, baked 2 minutes at 250° F.). Again, there was no attack by 100 MEK rubs or 200 water rubs.

This stability compares very favorably with paint made from untreated anatase titanium dioxide in Example 4, and is far better than for paints made from aluminum-bearing rutile titanium dioxide pigments in Examples 2 and 3.

The foregoing examples indicate that substantial improved stability at room temperature and raised temperature can be obtained in pigmented coatings by using cation-free opacifying pigments in conjunction with an ion-exchange treated binder comprising a functional reactive emulsion polymer and a glycoluril derivative, but are not intended to be limiting except by the appended claims.

I claim:

1. In a process for producing a pigmented paint composition based on polymeric binder comprising a functionally reactive emulsion polymer and a coreactive glycoluril derivative, the improvement comprising:

copolymerizing ethylenically unsaturated monomers in an aqueous polymerization medium and in the presence of surfactants and initiators, said ethylenically unsaturated monomers including carboxyl or hydroxyl functional monomers but excluding amino monomers to produce a functionally reactive emulsion polymer;

treating the functionally reactive emulsion polymer with an ion exchange resin to remove cations from the functionally reactive emulsion polymer to produce an ion-exchange emulsion polymer having a pH of less than 2.5;

combining said ion-exchanged emulsion polymer with a cation-free opacifying pigment having less than 0.5% by weight residual cation to form a pigmented paint composition.

2. The process in claim 1 where the opacifying pigment is titanium dioxide pigment.

3. The process in claim 2 where the pigment is anatase titanium dioxide.

4. The process in claim 1 where the opacifying pigment surfaces are essentially free of cations.

5. The process in claim 1 where the opacifying pigment contains less than 0.5% by weight aluminum, but otherwise is essentially cation-free.

6. The process in claim 1 where the cation-free opacifying pigment is produced by removing cations from the surface of cationic surface treated pigment.

7. The process in claim 6 where the pigment is titanium dioxide.

8. The process in claim 7 where the titanium dioxide is rutile.

9. The process in claim 1 wherein the reactive emulsion polymer is mixed with a glycoluril derivative prior to the step of treating with an ion exchange resin.

10. The process in claim 1 wherein the ion exchange resin is a protonated cation exchange resin.

11. The process in claim 1 wherein glycoluril is treated separately with an ion exchange resin and thereafter mixed with the reactive emulsion polymer treated with the ion exchange resin.

* * * * *